(12) United States Patent
Loughlin et al.

(10) Patent No.: US 6,250,818 B1
(45) Date of Patent: Jun. 26, 2001

(54) CONNECTOR FOR OPTICAL FIBERS

(75) Inventors: John P. Loughlin, Lebanon; Ronald J. Vecchio, Morris Plains, both of NJ (US)

(73) Assignee: Johanson Manufacturing Corporation, Boonton, NJ (US)

( * ) Notice: Subject to any disclaimer, the term of this patent is extended or adjusted under 35 U.S.C. 154(b) by 0 days.

(21) Appl. No.: 09/253,422

(22) Filed: Feb. 19, 1999

(51) Int. Cl.$^7$ ................................ G02B 6/00; G02B 6/36
(52) U.S. Cl. .............................................................. 385/86
(58) Field of Search ................................ 385/86–90, 147

(56) References Cited

U.S. PATENT DOCUMENTS

| | | |
|---|---|---|
| 4,076,379 | 2/1978 | Chouinard . |
| 4,174,882 | 11/1979 | McCartney . |
| 4,738,507 | 4/1988 | Palmquist . |
| 5,042,891 | 8/1991 | Mulholland et al. . |
| 5,050,956 | 9/1991 | Carpenter ............... 385/140 |
| 5,066,094 | 11/1991 | Takahashi ............... 385/140 |
| 5,136,681 | 8/1992 | Takahashi ............... 385/140 |
| 5,187,768 | 2/1993 | Ott et al. ................. 385/140 |
| 5,719,667 * | 2/1998 | Miers ...................... 356/73 |
| 5,734,778 | 3/1998 | Loughlin ................. 385/140 |
| 5,745,308 * | 4/1998 | Spangenberg ........... 359/818 |
| 5,936,986 * | 8/1999 | Cantatore et al. ....... 372/38.02 |
| 5,973,842 * | 10/1999 | Spangenberg ........... 359/619 |

* cited by examiner

Primary Examiner—Akm E. Ullah
(74) Attorney, Agent, or Firm—Morgan & Finnegan, L.L.P.

(57) ABSTRACT

A connector for optical fibers. A coupler is designed to affix an optical component. A cable mounting structure is designed to retain an optical cable, and to retain a terminating ferrule in an optical alignment with the optical component. A distance between a front face of the termination ferrule and a tail end of the cable mounting structure is about 1.648". An adjuster bears threads mating to threads of the cable mounting structure. The adjuster is coupled in a fixed axial relationship with the coupler. An axial relative displacement between the cable mounting structure and the optical component is adjustable by relative rotation of the cable mounting structure and adjuster. The length of the adjuster is about 0.415". The cable mounting structure bears a shoulder unitarily formed with a threaded component of the cable mounting structure effective as a limit stop of to limit relative movement of the adjuster. A chassis, in a stable axial relationship with the coupler, defines a channel within which the cable mounting structure is laterally and anti-rotationally stabilized. The chassis has two primary parts unitized by an interference fit. A spring urges the adjuster directly, without an intervening thrust washer, on a non-rotating surface of the chassis. A threaded locknut is designed to jam relative rotation of the cable mounting structure and adjuster to secure a position of the relative rotation of relative rotation of the cable mounting structure and adjuster.

52 Claims, 7 Drawing Sheets

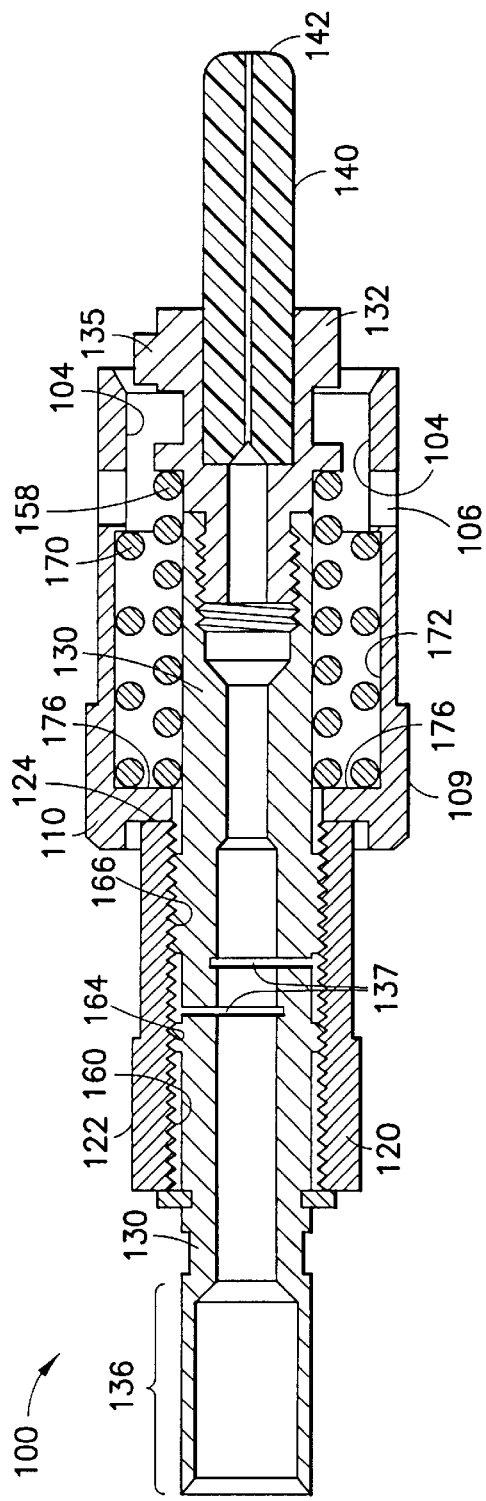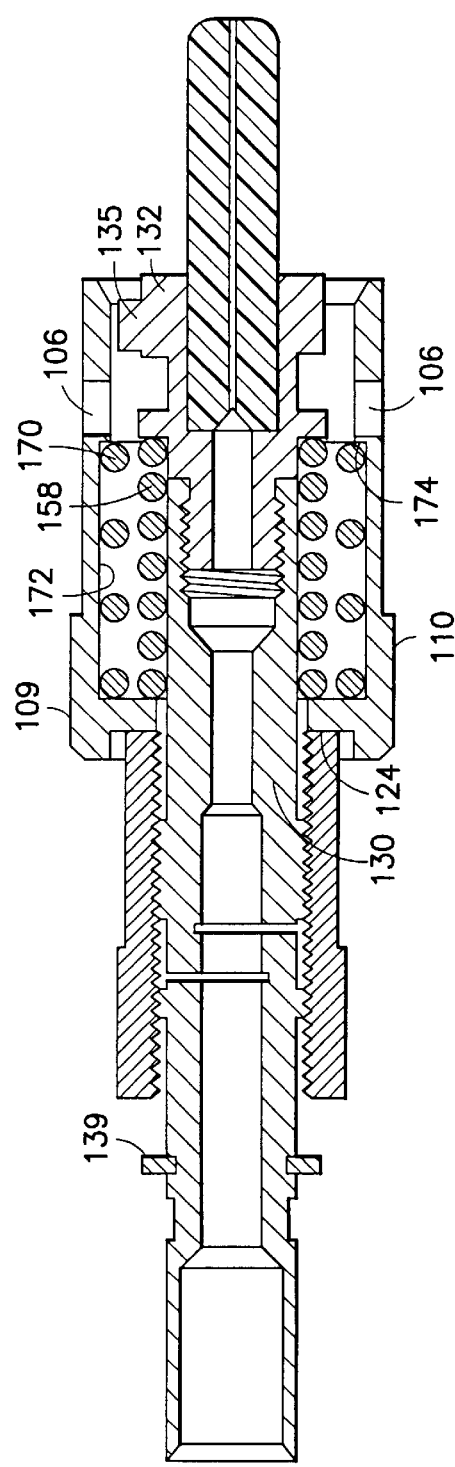

CONNECTOR FOR OPTICAL FIBERS

BACKGROUND

The invention relates to connectors for signal conductors such as optical communication fibers.

Known fiber optic connectors enable two optical fibers to be connected end-to-end, or allow the connection of a fiber to a device, such as optical sources (lasers and LED's), optical receivers (PIN or APD diodes), etc. Fiber optic connectors are generally designed to minimize losses in the connection.

Several quick-fit standard connectors are known for use with optical fiber. An "FC" connector is a circular metal connector, where the male-to-female mechanical parts thread together. An "ST" connector is much like a BNC connector. The mechanical parts of an ST connector include a male metal cylindrical bayonet part that inserts into a cylindrical female part. The male part has a small stud that protrudes radially, that fits into a J-shaped channel in the wall of the female part. Once the stud reaches the bottom point of the J, a tension spring holds it there. An "SC" connector is rectangular, generally made of plastic, and the two mating components are mechanically conjoined by a snap-fit tongue. There are other standards for quick-fit optical connectors, as well.

In these three example standards, the terminal centimeter or so of the fiber is held in a ceramic ferrule, about 2.5 mm in diameter. (Other standards use other diameters for the ferrules, for instance 1.5 mm.) A ceramic split sleeve assists the mechanical parts of the connectors to hold two ferrules in an opposed coaxial relationship, so that an optical signal from one fiber falls on the end of the other.

Optical fiber based transmission systems have historically been designed to maximize optical power transmission to achieve high-speed, long-distance communications. More recently, optical fiber based systems are deployed in relatively short-distance applications and within other complex optical systems that require that the optical power be managed. Optical attenuators regulate the absolute power level of light traveling within any given path of an optical transmission system. In short distance applications, excessive power is attenuated to maintain the strength of an optical signal within a certain range, to avoid receiver saturation. More advanced optical systems, such as those employing fiber amplifiers and wavelength division multiplexing (WDM) or dense wavelength division multiplexing (DWDM), require careful optical power management in order to optimize system performance.

SUMMARY

In general, in a first aspect, the invention features a connector. A coupler is designed to affix an optical component. A cable mounting structure is designed to retain an end of an optical fiber in an optical alignment with the optical component. The cable mounting structure bears threads mating to threads of an adjuster. An axial relative displacement between the cable mounting structure and the optical component is adjustable by relative rotation of the cable mounting structure and adjuster. A threaded locknut is designed to jam relative rotation of the cable mounting structure and adjuster to secure a position of the relative rotation of relative rotation of the cable mounting structure and adjuster.

In general, in a second aspect, the invention features a connector. A coupler is designed to affix an optical component. A cable mounting structure is designed to retain an optical cable, and to retain a terminating ferrule in an optical alignment with the optical component. A distance between a front face of the termination ferrule and a tail end of the cable mounting structure is no more than about 1.740". An adjuster bears threads mating to threads of the cable mounting structure. An axial relative displacement between the cable mounting structure and the optical component is adjustable by relative rotation of the cable mounting structure and adjuster.

In general, in a third aspect, the invention features a connector. A coupler is designed to affix an optical component. A cable mounting structure is designed to retain an optical cable, and to retain a terminating ferrule in an optical alignment with the optical component. An adjuster bears threads mating to threads of the cable mounting structure. An axial relative displacement between the cable mounting structure and the optical component is adjustable by relative rotation of the cable mounting structure and adjuster. The length of the adjuster is no more than about 0.450".

In general, in a fourth aspect, the invention features a connector. A coupler is designed to affix an optical component. A cable mounting structure is designed to retain an end of an optical cable in an optical alignment with the optical component. An adjuster bears threads mating to threads of the cable mounting structure. An axial relative displacement between the cable mounting structure and the optical component is adjustable by relative rotation of the cable mounting structure and adjuster. The cable mounting structure bears a shoulder unitarily formed with a threaded component of the cable mounting structure, effective as a limit stop of to limit relative movement of the adjuster.

In general, in a fifth aspect, the invention features a connector. A coupler is designed to affix an optical component. A cable mounting structure is designed to retain an end of an optical cable in an optical alignment with the optical component. An adjuster bears threads mating to threads of the cable mounting structure. The adjuster is coupled in a fixed axial relationship with the coupler. An axial position of the cable mounting structure relative to the coupler is adjustable by rotation of the adjuster. The adjuster is urged by a spring directly, without an intervening thrust washer, on a non-rotating surface in a fixed rotational relationship to the coupler.

In general, in a sixth aspect, the invention features a connector. A coupler is designed to affix an optical component. A cable mounting structure is designed to retain an end of an optical cable in an optical alignment with the optical component. A chassis is in a stable axial relationship with the coupler. The chassis defines a channel within which the cable mounting structure is laterally and anti-rotationally stabilized. The chassis includes two primary parts unitized by an interference fit.

Particular embodiments of the invention may advantageously include one or more of the following features.

One surface of the mating threads may be gold plated and the other surface may be chromate plated. One surface of the bearing between the adjuster and the non-rotating surface may be gold plated, and the other surface of the bearing may be chromate plated.

The distance between the front face of the termination ferrule and the tail end of the cable mounting structure may be no more than about 1.700" or 1.660". The length of the adjuster may be no more than about 0.445", 0.440", 0.435", 0.425", or 0.420".

The cable mounting structure may be held in an axial sliding relationship with the coupler, with anti-rotational stability provided by keyed mating of components of the connector. The keyed mating components may include male and female members mating at a regular polygon cross section. A key may mate with a key way of the optical component to be affixed, and the key and key way may be cooperatively designed to provide anti-rotational stability to the cable mounting structure.

The threading pattern of one of the mating threads may be deliberately distorted to induce added friction in the mating threads and to stabilize the axial relative displacement between the cable mounting structure and the optical component. The threading of the two mating threads may be deliberately preserved at a uniform thread pitch and contour. A resilient member may be integrated into the connector, designed to induce added friction in the mating threads and to stabilize the axial relative displacement between the cable mounting structure and the optical component.

The chassis may define a channel within which the cable mounting structure is laterally and anti-rotationally stabilized. The rear wall of the chassis may be no more than about 0.080" thick, measured in the dimension of the axis of the connector.

The locknut may be threaded onto the chassis. The adjuster, chassis, and locknut may be cooperatively designed to jam the relative rotation of the cable mounting structure and adjuster by tightening the locknut against the adjuster. The locknut may be threaded onto the cable mounting structure for jamming against the adjuster.

A spring may be arranged to bias the axial relative displacement between the cable mounting structure and the adjuster. The spring may be held captive within the chassis.

A spring may be arranged to oppose the optical component to be affixed and to urge the connector into a stable spatial relationship with the optical component.

The coupler may be a coupling nut conforming to the ST standard, or to the FC standard.

The ferrule may be polished at an angle displaced from an axis of the connector. The terminal end of the ferrule may be coated with an antireflective coating.

The variable attenuator connector (VAC) may provide one or more of the following advantages.

Depending upon the form used, the VAC may simultaneously provide the function of a connector and an adjustable attenuator, eliminate the need for an inventory of several fixed level attenuators, provide very low levels of back reflected energy, and may subsume the functions of up to three separate terminations within a given optical path. With a VAC only one termination is needed, that of the VAC itself. The VAC can be deployed as a user installable connector, a factory-terminated jumper cable, or a factory assembled in-line cable assembly.

When the VAC is used as a user installable connector, only one termination is typically required in place of three (i.e. termination at the entry into an attenuator, termination at the exit of the attenuator and the termination of the input connector itself). Elimination of two terminations confers economic and reliability advantages. Terminations cost about $10 each and fewer terminations mean fewer exposed fiber end faces, reducing maintenance issues and increasing long-term reliability.

The VAC can be used in place several fixed value attenuators. Installation of optical fiber systems can introduce variables that are not anticipated. The exact level of attenuation required for a particular link may not be known until installation is complete. Using fixed value attenuators requires that the installer inventory various levels in order to accommodate needs as they arise. A single VAC can be installed and adjusted to meet the requirements of any link.

Where multiple fiber lines reach a common point, at different signal levels, a VAC may be used to bring the higher-signal line down to the level of the lower-signal line, or several VAC's may be used to bring a collection of high-signal lines down to the level of signals accepted by the device at the junction.

The VAC may also offer cost advantages. Variable attenuators with similar characteristics to the VAC sell for over $150 in quantities of 100 or so, while connectors cost about $10 to $20 each. Fixed attenuators also sell for upwards of $100 to $200 in similar volumes, and a palette of several values must be inventoried to meet unknown requirements. The cost of the VAC is significantly below $100, thus saving upwards of $100 per use.

Other cost advantages may accrue from ease of installation and maintenance. Because a single VAC can serve the function of a wide range of values of fixed attenuators, and can subsume several terminations, system design and installation is eased, and long term reliability is enhanced.

In relatively short distance applications (i.e. Local Area Networks, Central Office Switching, CATV distribution systems and other proprietary networks), which make up some of the fastest growing segments of the fiber optic markets, it is important to ensure that optical power levels are within the dynamic range of the receivers used. By using standard "off the shelf" receivers with a fixed and cost effective dynamic range, designers can keep systems cost down. Variations in optical power, due to the variable lengths and gains seen within these applications, can be managed by VAC's, thereby ensuring proper operation of the receivers.

In more complex optical systems (i.e. fiber amplifiers and WDM), optical power management is required to ensure optimum performance of a variety of parameters. Fiber amplifiers receive and amplify optical signals of various wavelengths. The gain of the amplifier is dependent on such variable as input power level and the gain curve of the amplifier. In other words, amplifiers do not amplify different wavelengths at the same rate and the gain is dependent upon input power. VAC's can be used to manage input power levels of various wavelengths to ensure proper amplification and can be used again at the output of the amplifier to adjust output powers to meet system requirements. In WDM systems, different wavelengths are used to distribute information over different paths and are combined and separated throughout the system. VAC's can be used to adjust power at these "add/drop" points to meet system requirements.

A VAC can be adjusted over time and in situ. As systems age or are reconfigured, attenuation levels can be adjusted to meet the system's new requirements, without having to add new components or "breaking" the link to remove and install a new fixed attenuator.

The VAC will thus find usage in a wide range of optically based systems.

A lock nut may be tightened to hold the attenuation value constant, reducing detuning caused by vibration or careless handling. A shorter body for the VAC reduces the lever moment around the connection, reducing the amount of flex imposed on the connection itself, thereby improving reliability. Integrating multiple parts into single parts, forming a better bearing surface on parts that bear on each other to eliminate a thrust ring bearing, and machining the parts so that they can be joined by a press fit without an adhesive, improve manufacturability and cost, by reducing the number of steps required to manufacture the VAC, reducing the parts inventory that must be carried, improve reliability, and improve environmental stability. Improving tolerances and clearances reduces thread backlash and hysteresis in the adjustment of the attenuation. Removing tension slots from the threaded components may reduce the risk of jamming.

The above advantages and features are of representative embodiments only, and are presented only to assist in understanding the invention. It should be understood that they are not to be considered limitations on the invention as defined by the claims, or limitations on equivalents to the claims. For instance, some pairs of these features or advantages are mutually contradictory, in that they cannot be simultaneously present in a single embodiment. Similarly, some features or advantages are applicable to one aspect of the invention, and inapplicable to others. Thus, this summary of features and advantages should not be given undue weight in determining equivalence. Additional features and advantages of the invention will become apparent in the following description, from the drawings, and from the claims.

DESCRIPTION OF THE DRAWING

FIGS. 1b, 1c, 1d, 2b, 2c, 2d and 3 are section views of variable attenuator connectors.

DESCRIPTION

Figure 1A:
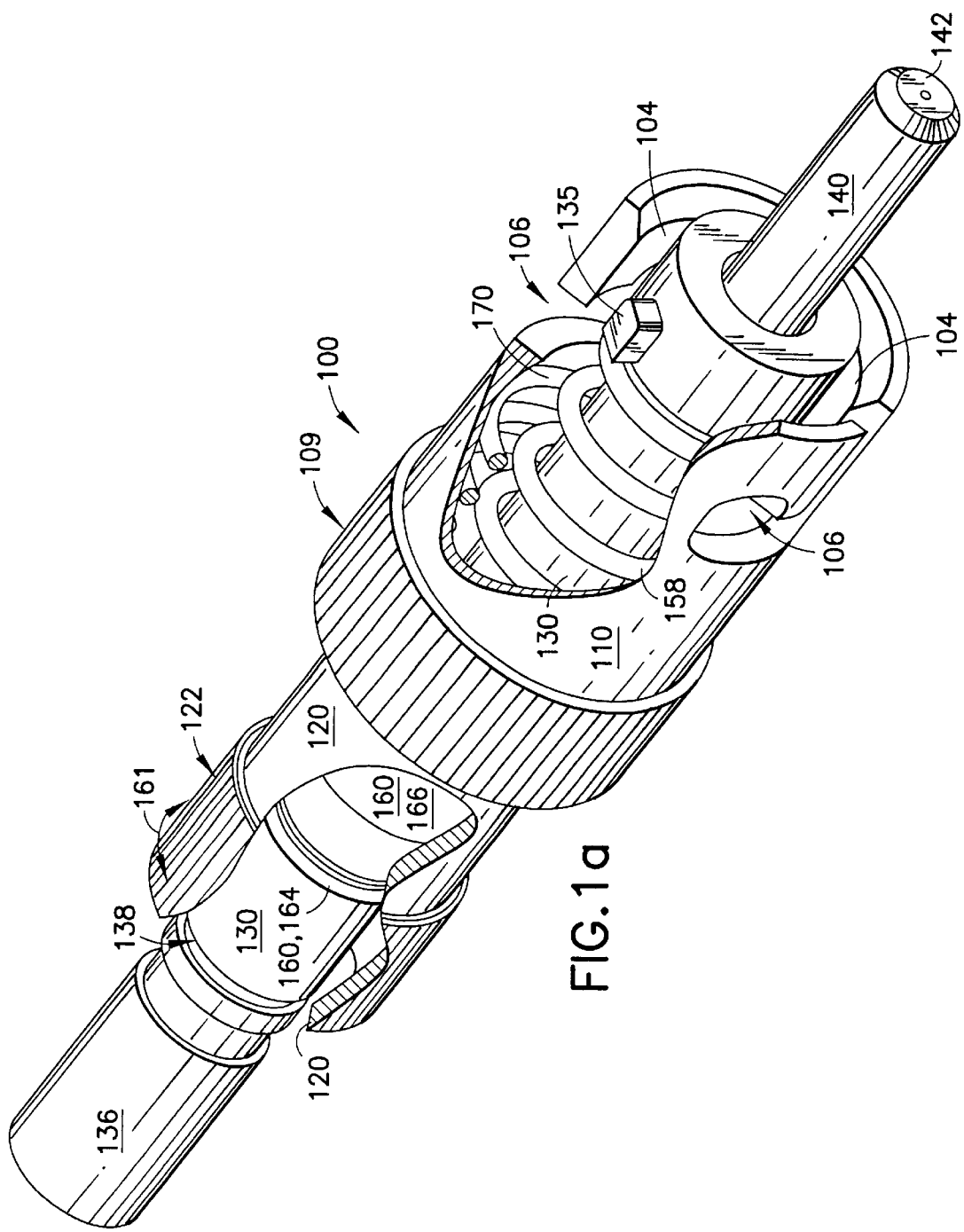
FIGS. 1a and 2a are perspective views, partially cut away, of variable attenuator connectors.
Figure 1D:
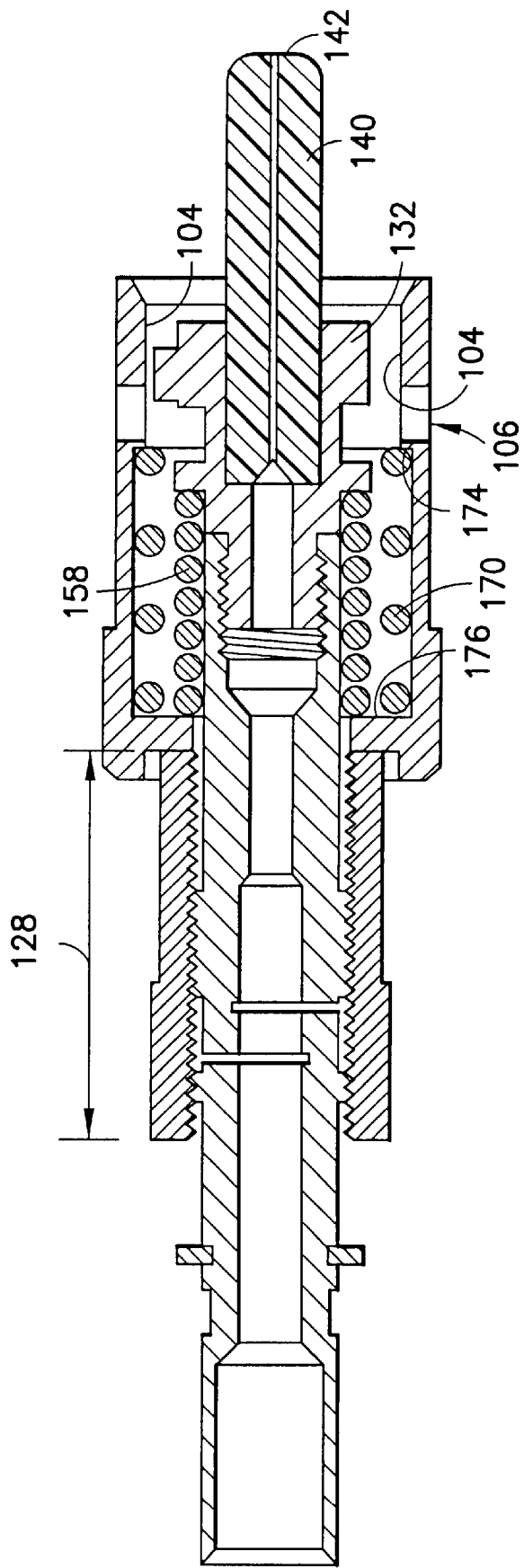
Figure 2A:
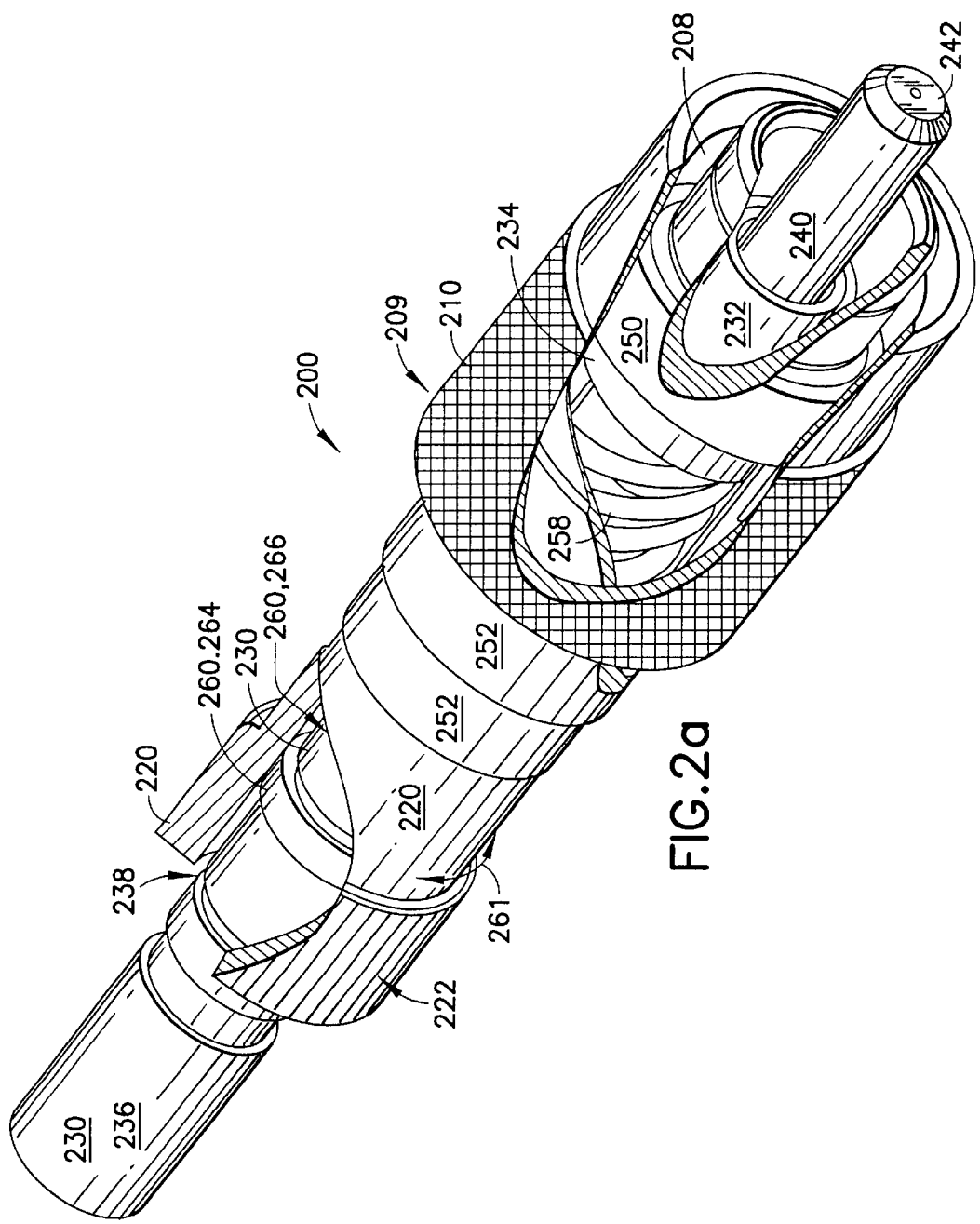
Figure 2B:
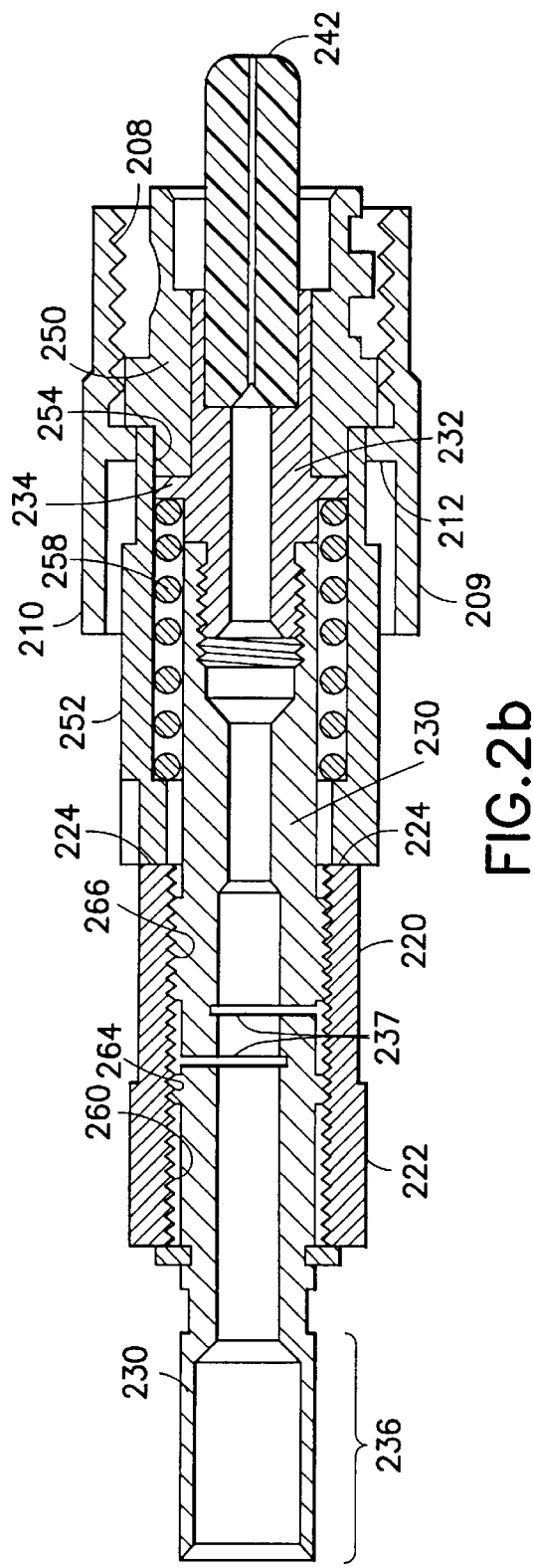
Figure 2C:
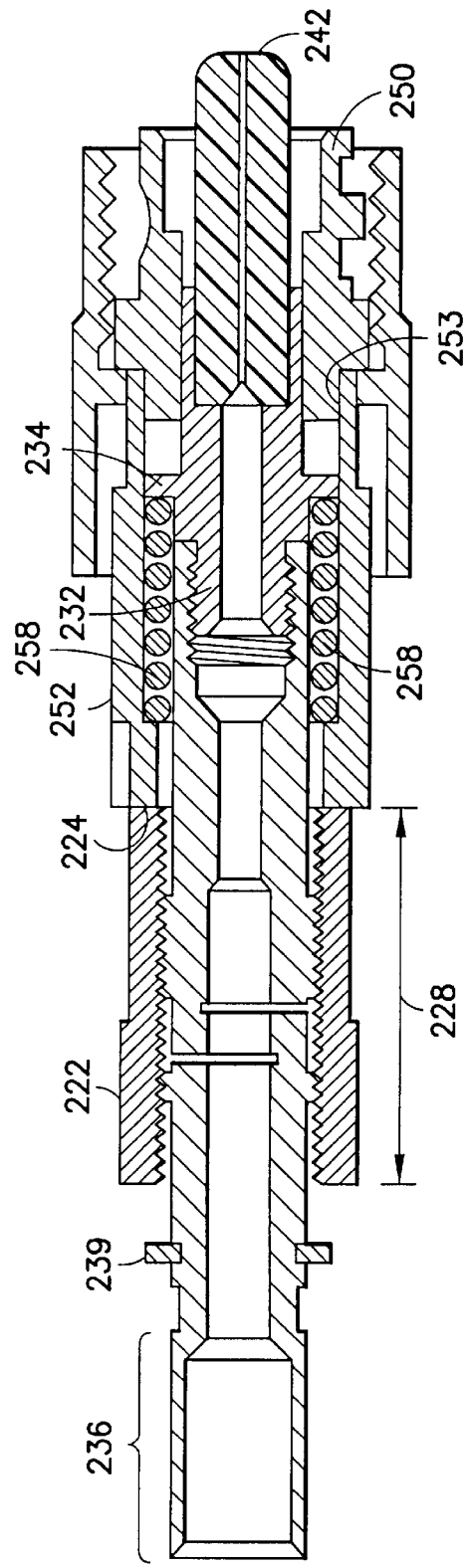
Figure 2D:
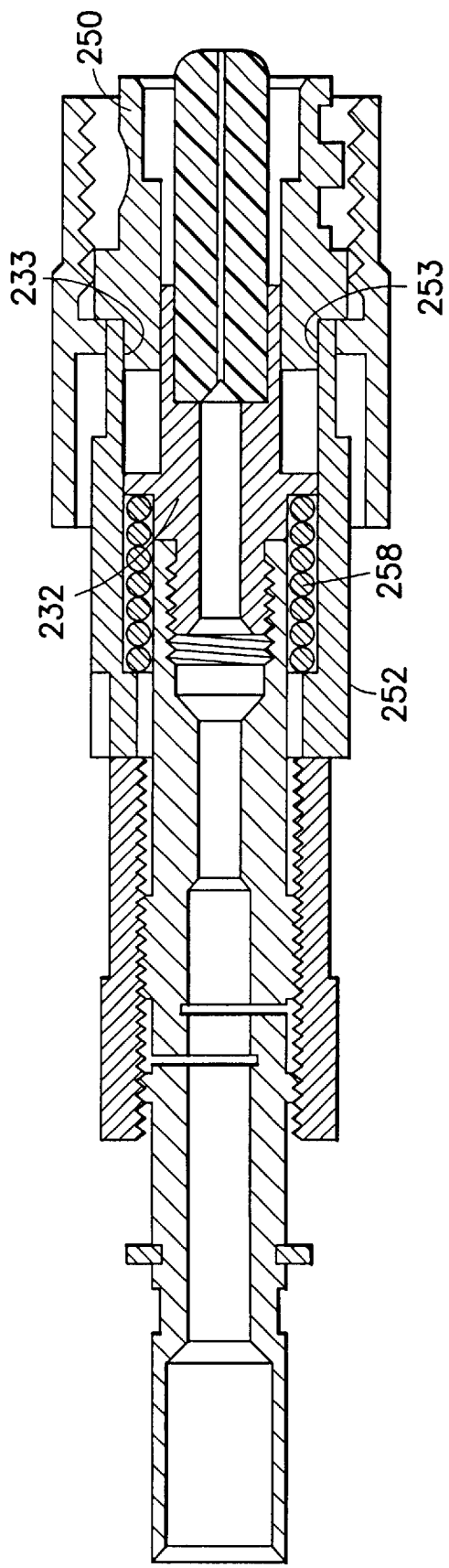

A variable attenuator connector (VAC) is a component for use in a fiber optic system that combines two functions—a connector, to couple two optical fibers together, end-to-end, and an attenuator, a component that introduces a controllable loss into the transfer from one fiber to the other.

FIGS. 1a–1d show an ST VAC 100, and FIGS. 2a–2d and 3 show FC VAC's 200. Each VAC includes three major assemblies that move as units. Coupling nut 110, 210 is stationary, and anchors VAC 100, 200 to another optical component. Chassis 250, 252 stands stationary with coupling nut 210. Adjusting nut 120, 220 is axially stationary (left to right in the figures) and rotates on the connector axis. Core 130, 132, 230, 232 and ferrule 140, 240 move axially, but do not rotate.

Coupling nut 110, 210 provides a secure but easily-disconnected and -reconnected connection to another optical component, not shown, typically another optical fiber or an optical signal-processing device connected at one end of the fiber. Adjusting nut 120, 220 is threaded onto core body 130, 230. Core end 132, 232 securely mounts ferrule 140, 240. In the FC embodiment of FIGS. 2a–2d, chassis 250, 252 is the stationary body of the VAC, with anti-rotation relief 212 between chassis 250, 252 and coupling nut 210 to allow threaded coupling nut 210 to be turned while chassis 250, 252 and core 230, 232 remain rotationally stationary. Coil spring 158, 258 urges core 130, 132, 230, 232 to the right relative to coupling nut 110, 210 and adjusting nut 120, 220, stabilizing the axial position of core 130, 132, 230, 232 and ferrule 140, 240 relative to the other optical component. As adjusting nut 120, 220 is turned, arrows 161, 261, threads 160, 260 between adjusting nut 120, 220 and core body 130, 230, move core 130, 132, 230, 232 left or right with respect to coupling nut 110, 210. The right-to-left motion of core 130, 132, 230, 232 and ferrule 140, 240 is shown in FIGS. 1b, 1c, 1d and 2b, 2c, and 2d. The linear axial motion of the fiber-containing ferrule enlarges or reduces an air gap between the fiber and a mating fiber, adapter or receptacle. The attenuation of the signal strength is proportional to the size of the air gap. The size of the gap is regulated by the number of turns of adjusting nut 120, 220. In this way signal attenuation ranging from 0–40 dB or more can be achieved.

In a typical use, a number of fibers from disparate sources arrive at a common junction. The signals on the different fibers have different strengths. Each of the fibers is coupled to the junction by a VAC. The attenuation of each VAC is adjusted by turning adjusting nut 120, 220, so that the optical signals from the different fibers are fed into the junction at roughly equal amplitudes. Or, the signals may arrive at the junction at a level that exceeds the level that can be accepted by the device, and a VAC may be installed to attenuate the signal to a useable level.

Referring to FIGS. 1a–1d, in ST VAC 100, coupling nut 110 follows the dimensional standards required for a female portion of a mechanical connection of an ST connection. Coupling nut 110 has a smooth cylindrical inner surface 104 to mate with the smooth outer cylindrical surface of a ST adapter or receptacle, and J-shaped slots 106 to mate with a radial stud on a ST adapter or receptacle. Behind the forward section 104 of the inner surface of coupling nut 110 there is an enlarged inner diameter section 172, connected to the smaller-diameter forward section 104 at shoulder 174. Enlarged section 172 and shoulder 174 positively contain compression spring 170, as discussed further below. Coupling nut 110 may be formed of machined brass, or steel, stainless steel, many plastics, aluminum, or other similar materials, and may be formed by machining, die casting, injection molding, or other processes.

Referring to FIGS. 2a–2d, in FC VAC 200, coupling nut 210 has a threaded interior surface 208 that threads onto a male threaded coupling device of an FC adapter or receptacle. The materials and methods for forming of coupling nut 210 parallel the alternatives suggested for coupling nut 110, supra.

In other embodiments, not shown, coupling nut 110, 210 may be replaced by other known coupling devices, which will typically be defined by an industry standard. For instance, an SC VAC uses a plastic fitting. The fitting is rectangular for rotational stability. Axial locking is provided by the engagement of spring tabs into mating slots.

A knurled external rear section 109, 209 provides the operator with a positive and secure grip during the push and twist motion required during engagement and disengagement of coupling nut 110, 210 with the opposing male adapter or receptacle. The knurls may be of any convenient configuration, including diagonal, straight, cross-hatched, or diamond.

Adjusting nut 120, 220 has a fine internal thread 160, 260 to match the external thread on core body 130, 230. In some embodiments, this internal thread runs the entire length of adjusting nut 120, 220. In other embodiments, the internal thread is broken into sections, or runs only part of the length of adjusting nut 120, 220.

Adjusting nut 120, 220 may have a knurled outer surface 122, 222 to provide a positive grip for the operator. The knurls may be of any convenient form.

Surface 124, 224 of adjusting nut 120, 220, coupling nut 110 and chassis cap 252 are machined to be smooth and perpendicular to the axis of connector 100, 200. One surface is gold plated, and the other is chromate plated. The surface bearing between adjusting nut 120, 220 and chassis cap 252 is self-lubricating, so that no thrust washer need be provided to reduce binding between adjusting nut 120, 220 and the non-rotating portions 110, 210, 250, 252 of VAC 100, 200. Adjusting nut 120, 220 bears directly on coupling nut 110 or chassis cap 252. In alternative embodiments, a thrust washer may be provided between adjusting nut 120 and coupling nut 110 or chassis 250, 252. Washerless embodiments can generally be made shorter than thrust washer embodiments, by the thickness of the washer.

Figure 3:
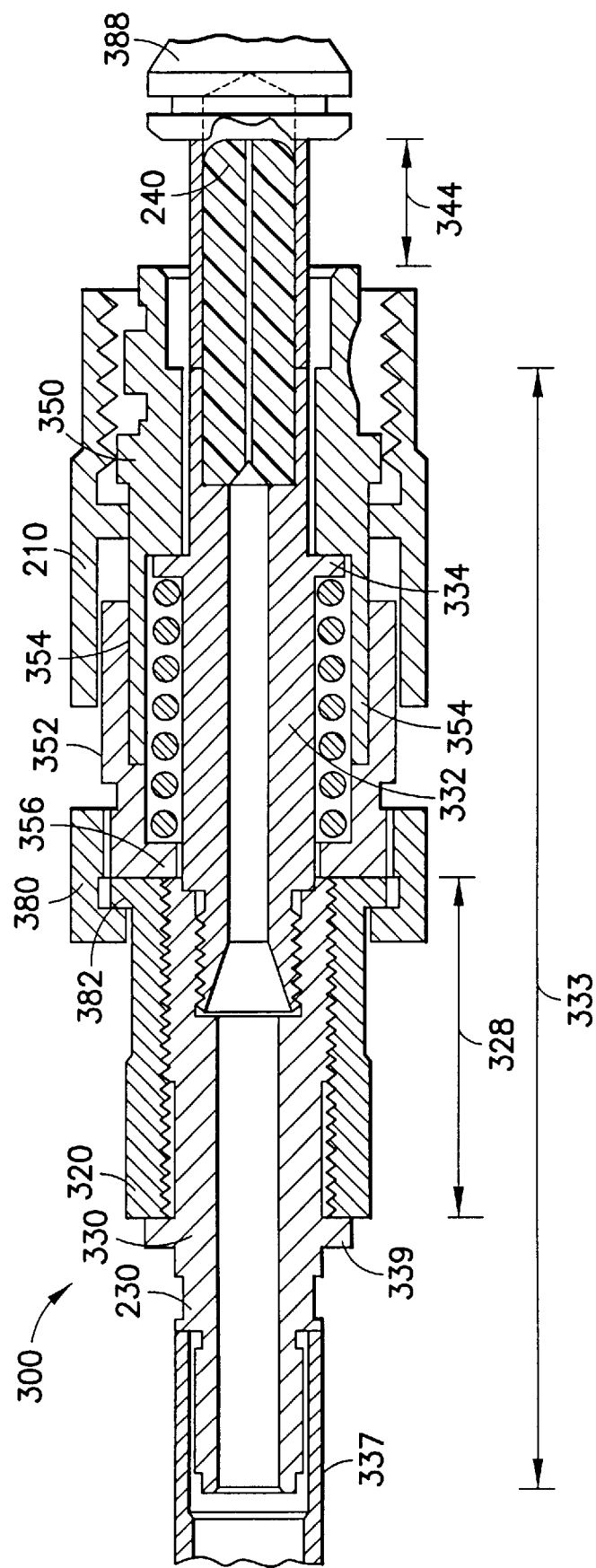

It is desirable to keep the overall length (dimension 128, 228, 328) of adjusting nut 120, 220 short, to reduce the overall length of connector 120, 220, as one design goal to be balanced against other design goals. In the embodiment of FIGS. 1a–1d, adjusting nut 120 is from 0.455" to 0.500" long. In the embodiment of FIGS. 1a–1d, adjusting nut 120 is 0.455" long. In the embodiment of FIG. 3, adjusting nut 320 is 0.415" long (dimension 328). Progressively shorter lengths, such as 0.450", 0.445", 0.440", 0.435", 0.430", 0.425", 0.420", 0.415", 0.410", 0.405", 0.400", 0.390", 0.380", 0.370", 0.360", 0.350", 0.340", 0.330", 0.320", 0.310", 0.300", 0.290", 0.280", 0.270", 0.260", 0.250", 0.240", 0.230", 0.220", 0.210", 0.200" are also desirable, until the shorter dimension is overweighed by competing constraints and design goals, such as manufacturability, strength, and the dexterity of assembly people and the user.

Referring to FIGS. 1a–1d, 2a–2d and 3, core 130, 132, 230, 232, 330, 332 is formed from two parts that are fused together during manufacture, core body 130, 230, 330 and core end 132, 232, 332. The materials and methods for forming of core parts 130, 132, 230, 232, 330, 332 parallel the alternatives suggested for coupling nut 110, supra.

The overall length (dimension 333) of core 130, 132, 230, 232, 330, 332 is designed with short overall length as one of the desirable goals to be balanced against other design goals. In the embodiment of FIG. 3, the length (dimension 333) of core 330, 332 is 1.365". The length 344 of ferrule 240 is fixed by the FC connector standard at 0.158" beyond the face of coupling nut 210, or 0.283" beyond the end of core 332. Thus, the overall length of connector 300 from the front face 242 to the end of core 330, 332 is 1.648". Progressively shorter lengths, such as 1.750", 1.740", 1.730", 1.720", 1.710", 1.700", 1.690", 1.680", 1.670", 1.660", 1.650", 1.640", 1.630", 1.620", 1.610", 1.600", 1.590", 1.580", 1.570", 1.560", 1.550", 1.540", 1.530", 1.520", 1.510", 1.500", 1.480", 1.460", 1.440", 1.420", 1.400", 1.380", 1.360", 1.340", 1.320", and 1.300" are also desirable, until the shorter dimension begins to interfere with competing constraints and design goals, as discussed above in connection with the adjusting nut 120, 220.

The front end of core end 232, 332 has an enlarged outer diameter 234, 334 to provide a close fit with the inner diameter of key body 250, 350 and cap 252, 352 thereby stabilizing radial movement of core 230, 232, 330, 332.

In the ST embodiment of FIGS. 1a–1d, key 135 projects radially outward from core end 132 into a key way in the mating coupling device of the mating adapter or receptacle, to provide anti-rotation stability of core 130, 132 as the coupling is made and during attenuation adjustment.

In the FC embodiments of FIGS. 2a–2d and 3, core end 232, 332 has a male hex cross section that mates with a hex female cross section of the bore of key body 250, 350. The hex fit provides anti-rotation stability between core end 232, 332 and key body 250, 350. Other keying configurations are also suitable, for instance other polygons, or a projecting key that mates with a key way. The fit between core end 232, 332 and key body 250, 350 is maintained to close tolerances by careful machining and plating to reduce backlash and other play conditions in the VAC 100, 200 as a whole.

The internal diameters of core 130, 132, 230, 232, 330, 332 are dimensioned to accommodate commonly used fiber optic cables. Section 136, 236 at the rear of core body 130, 230 has an inner diameter slightly larger than the outer diameter of most fiber optic cable sheathing. Section 136, 236 may be crimped to secure the fiber optic cable to the VAC. In an alternative embodiment, shown in FIG. 3, a separate and replaceable crimp fitting 337 may be provided to secure the fiber optic cable.

In the embodiments of FIGS. 1a–1d and 2a–2d, core body 130, 230 has tension slots 137, 237, slots formed as cuts most of the way through the cross-section of core body 130, 230. After tension slots 137, 237 and threads 160, 260 are formed onto core body 130, 230, core body 130, 230 is axially pulled, to induce a very slight inelastic deformation at the bases of tension slots 137, 237. Alternatively, core body 130, 230 can be slightly and elastically compressed or extended after tension slots 137, 237 are cut, while threads 160, 260 are machined. The tension slots 137, 237 are sized, positioned and compressed such that a desired biasing tension between the threads 160, 260 of core body 130, 230 and adjusting nut 120, 220. The tension reduces thread backlash, so that a reversal of the direction of rotation of adjusting nut 120, 220 results in near-immediate and predictable corresponding axial movement of core 130, 132, 230, 232. Tension slots 137, 237 also provide a controlled frictional torque, to stabilize rotation of adjusting nut 120, 220 against vibration, environmental disturbances, and other sources of unintended rotation.

In an alternative embodiment, shown in FIG. 3, tension slots 137, 237 are eliminated. The anti-backlash function may be performed adequately by springs 158, 258. Elimination of the tension slots has three benefits. First, it eliminates a manufacturing step. Second, it reduces the risk of jamming. For instance, if the inelastic deformation of tension slots 137, 237 exceeds half of a thread pitch, then adjusting nut 120, 220 may find the wrong thread as it is threaded onto core body 130, 230. Third, the tension slots can allow epoxy to flow to unwanted places, where it can jam threads 160, 260.

Referring again to FIGS. 1a–1d and 2a–2d, core body 130, 230 has a channel 138, 238 into which is fitted a circlip or crescent ring 139, 239. Channel 138, 238 may be made wider in the axial dimension than crescent ring 139, 239, and the excess may be filled with an elastomer for strain relief. In an alternative embodiment, shown in FIG. 3, rather than channel 138, 238, a raised shoulder 339 is formed on core body 130, 230. Shoulder 339 may be specifically formed onto core body 130, 230, or may be manufactured as a free consequence of forming core body 130, 230, because a screw machine leaves such a shoulder as a matter of course after forming threads 160, 260. During assembly, adjusting nut 120, 220 is threaded all the way down on core body 130, 230 until adjusting nut 120, 220 seats on shoulder 339 or crescent ring 139, 239. This serves as a registration mark or zeroing point during assembly so that as cap 252 is press fit onto key body 250 (see next paragraph), there will be a known minimum adjustment, a precise zero location. Crescent ring 139, 239 or shoulder 339 also serves as a reference mark for the portion 136, 236 that is safe to crimp. The alternative shoulder 339 embodiment simplifies assembly by eliminating several steps, including the step of attaching crescent ring 139, 239, and the paper work and supply questions that attach to each part.

Ferrule 140, 240 is pressed into a counter bore at the front end of core end 132, 232. Rough optical alignment of the two mating fibers is attained by maintaining very good precision in the mounting between core end 132, 232 and ferrule 140, 240, and finer optical alignment is provided by a sleeve in the mating adapter or receptacle.

In some embodiments, end face 142, 242 of ferrule 140, 240 may be treated to control optical back-reflections. As an optical signal propagates through the fiber, it passes through a series of interfaces (e.g., between two connectors) which cause a certain portion of the signal to reflect back toward its source. Such back-reflections cause undesirable interference with a signal. This is particularly important for high-speed transmission systems and analog signal transmission systems, such as cable TV. The terminal face 142, 242 of ferrule 140, 240 may be treated to control back-reflections. For instance, end face 142, 242 may be polished or coated to give it certain reflectance or scattering characteristics. Face 142, 242 may be polished or beveled at an angle. The extent of back-reflection is regulated by the angle polishing of the ferrule face. Once an air gap is created between ferrule 140, 240 and the mating component (for instance in the configuration of FIGS. 1d and 2d), light from the mating component is reflected at an angle. One back-reflection control effected by the angle is to change the location of the acceptance cone of the receiving fiber, so that reflections are not received as signals. Secondarily, though the light from the mating component still falls primarily on the center point of ferrule 140, 240 minimizing loss, the back reflection will fall off-center on the mating ferrule. Thus, only a minute fraction of back-reflected light re-enters the mating fiber. Back-reflections below −60 dB have been shown.

Chassis 250, 252, 350, 352 in the FC VAC 200, 300 of FIGS. 2a–2d or 3 is formed of two components, key body 250, 350 and cap 252, 352. Key body 250, 350 and cap 252, 352 are initially manufactured as two separate parts to allow spring 258 and the flange 234, 334 of core end 232, 334 to be placed into the cylindrical cavity formed within key body 250 and cap 252 before cap 252, 352 and key body 250, 350 are joined to each other, because the openings into the cavity are smaller than spring 258 and the key flange of core end 232, 332. The materials and methods for forming chassis parts 250, 252, 350, 352 parallel the alternatives suggested for coupling nut 110, supra. Cap 252, 352 and key body 250, 350 may either be joined together by an adhesive such as an anaerobic adhesive, cyanoacrylate, or 2-part epoxy, or surfaces 254, 354 may be precisely machined, and the contact length made generally longer, so that cap 252, 352 and key body 250, 350 may be unitized by an interference press fit. The latter method may eliminate steps of applying the adhesive, an overnight cure, and the problems of excess adhesive. Internal shoulder 356 is relatively thin, about 0.050", so reduce the overall length (dimension 333) of connector 100, 200.

Threads 160, 260 run the full length of adjusting nut 120, 220, and are separated into two distinct regions 164, 166 on core body 130, straddling tension slots 137, 237. All threads of the VAC are gold plated on one surface, and chromate plated on the other, to make the threads self-lubricating while reducing gold-on-gold galling.

In the ST embodiment of FIGS. 1a–1d, a large compression spring 170 with flat ground ends is sized and positioned so that when the VAC is connected to a standard ST adapter or receptacle, spring 170 will be compressed. Compression spring 170 has an outer diameter that is slightly larger than the inner diameter of larger-diameter section 172 of coupling nut 110. When the VAC is not connected to a mating ST adapter or receptacle, compression spring 170 is held captive between rear wall 176 and shoulder 174, and inner diameter 172 of coupling nut 110. As VAC 100 is connected to a mating male adapter or receptacle, compression spring 170 contacts the front face of the mating ST adapter or receptacle, and is compressed as the connectors become fully engaged. The compression of spring 170 between the face of the ST adapter or receptacle and inner face 176 of coupling nut 110 stabilizes the position of the VAC relative to the male adapter or receptacle, and holds the radial stud of the male adapter or receptacle at the bottom of the J-shaped slot 106.

Threads 160, 164, 166, 260, 264, 266 are cut at 200 threads to the inch. Thus, one turn of adjusting nut 120, 220 changes the air gap between ferrule 140, 240 and its mating ferrule by 0.005" or 127 $\mu$m. Each turn has been measured to provide between 1 and 4 dB of attenuation, depending on the particular model of VAC and thread pitch. The attenuation is precisely correlated to the number of turns, to within about 1/10 turn, or 0.1 to 0.4 dB. Other thread pitches are also possible, and the amount of attenuation per turn will vary accordingly. Generally, relatively fine threads of at least 100 to the inch are favored.

Referring again to FIG. 3, a locknut 380 threads onto chassis cap 252. After a desired level of attenuation is achieved by rotation 261 of adjusting nut 220, locknut 380 is tightened to lock the adjustment in place. Tightening locknut 380 jams it against a shoulder 382 of adjusting nut 320 to lock adjusting nut 320 into a desired rotation. In an alternative embodiment, a locknut could be threaded onto core body 130, 230, 330 between adjusting nut 120, 220, 320 and crescent ring 139, 239 or shoulder 339, to be tightened against adjusting nut 120, 220, 320 to jam it and lock it into a desired rotation. Locknut 380 reduces detuning that may be induced by vibration or careless handling during maintenance.

A VAC 100, 200 is assembled as follows.

Ferrule 140, 240 is pressed into core end 132, 232 and the small compression spring 158, 258 is slid over the external threaded section of core body 130, 230. A special tool may be employed to prevent damage to the threads during this assembly operation.

In the ST embodiment, compression spring 170 is pressed into the front section of coupling nut 110, 210 and the spring's diameter is initially reduced and then returns to its original size after it is completely pressed into the enlarged inner diameter section of coupling nut 110. Coupling nut 110 and spring 158 are slid over core body 130 from the rear end, compressing spring 158 between the enlarged diameter on the front of core body 130 and the internal rear wall 176 of coupling nut 110.

Adjusting nut 120, 220 is threaded onto core body 130, 230 with the knurled section 122, 222 to the rear. Adjusting nut 120, 220 is threaded up to a position such that its rear face is forward of the groove for the crescent ring 139, 239. A lubricant may be applied to reduce friction between coupling nut 110, 210 and adjusting nut 120, 220 and also between the internal threads of adjusting nut 120, 220 and the external threads of core body 130, 230.

Crescent ring 139, 239 is attached to core body 130, 230 in groove 138, 238.

Protective cap 388 is applied to protect ferrule 140, 240 during shipment.

When the VAC is installed, protective cap 388 is removed. A fiber optic cable is terminated in the VAC assembly using conventional means known to those experienced in the art. A strain relief may be employed at the rear of the VAC assembly to protect the optical fiber from breakage due to sideways pulling of the cable. U.S. Pat. No. 5,734,778, incorporated herein by reference, shows graphs of the precise attenuation control that can be achieved by a VAC.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments are within the literal scope of the following claims, and others are equivalent.

We claim:

1. A connector, comprising:
    a coupler designed to affix an optical component; and
    a cable mounting structure designed to retain an optical cable, and to retain a terminating ferrule in an optical alignment with the optical component; and
    an adjuster bearing threads mating to threads of the cable mounting structure, the adjuster being coupled in a fixed axial relationship with the coupler, an axial relative displacement between the cable mounting structure and the optical component being adjustable by relative rotation of the cable mounting structure and adjuster;
    the cable mounting structure bearing a shoulder unitarily formed with a threaded component of the cable mounting structure effective as a limit stop of to limit relative movement of the adjuster;
    a chassis in a stable axial relationship with the coupler, the chassis defining a channel within which the cable mounting structure is laterally and anti-rotationally stabilized, the chassis comprising two primary parts unitized by an interference fit;
    a spring urging the adjuster directly, without an intervening thrust washer, on a non-rotating surface in a fixed rotational relationship to the coupler; and
    a threaded locknut designed to jam relative rotation of the cable mounting structure and adjuster to secure a position of the relative rotation of relative rotation of the cable mounting structure and adjuster.

2. The connector of claim 1, the chassis designed to remain essentially rotationally stationary during the relative rotation of the cable mounting structure and adjuster, the locknut being threaded onto the chassis, the adjuster, chassis, and locknut being cooperatively designed to jam the relative rotation of the cable mounting structure and adjuster by tightening the locknut against the adjuster.

3. The connector of claim 1:
    further comprising a spring arranged to bias the axial relative displacement between the cable mounting structure and the adjuster and held captive within the two unitized parts of the chassis.

4. The connector of claim 1, the cable mounting structure being held in an axial sliding relationship with the coupler, with anti-rotational stability, by keyed mating of components of the connector, the keyed mating components comprising male and female members mating at a regular polygon cross section.

5. A connector, comprising:
    a coupler designed to affix an optical component; and
    a cable mounting structure designed to retain an end of an optical fiber in an optical alignment with the optical component, the cable mounting structure bearing threads mating to threads of an adjuster, an axial relative displacement between the cable mounting structure and the optical component being adjustable by relative rotation of the cable mounting structure and adjuster; and
    a threaded locknut designed to jam relative rotation of the cable mounting structure and adjuster to secure a position of the relative rotation of relative rotation of the cable mounting structure and adjuster.

6. The connector of claim 5, further comprising a chassis designed to remain essentially rotationally stationary during the relative rotation of the cable mounting structure and adjuster, the locknut being threaded onto the chassis.

7. The connector of claim 6, wherein the adjuster, chassis, and locknut are cooperatively designed to jam the relative rotation of the cable mounting structure and adjuster by tightening the locknut against the adjuster.

8. The connector of claim 5, the locknut being threaded onto the cable mounting structure for jamming against the adjuster.

9. The connector of claim 5, wherein:
    the cable mounting structure is further designed to retain a terminating ferrule in a optical alignment with the optical component.

10. The connector of claim 5, wherein the cable mounting structure bears a shoulder unitarily formed with a threaded component of the cable mounting structure effective as a limit stop of to limit relative movement of the adjuster.

11. The connector of claim 5, wherein the adjuster is urged by a spring directly, without an intervening thrust washer, onto a non-rotating surface in a fixed rotational relationship to the coupler.

12. The connector of claim 5:
    further comprising a resilient member integrated into the connector, and designed to induce added friction in the mating threads and to stabilize the axial relative displacement between the cable mounting structure and the optical component.

13. The connector of claim 5, further comprising a spring arranged to bias the axial relative displacement between the cable mounting structure and the adjuster.

14. A connector, comprising:
    a coupler designed to affix an optical component;
    a cable mounting structure designed to retain an optical cable, and to retain a terminating ferrule in an optical alignment with the optical component; and
    an adjuster bearing threads mating to threads of the cable mounting structure, an axial relative displacement between the cable mounting structure and the optical component being adjustable by relative rotation of the cable mounting structure and adjuster.

15. The connector of claim 14, wherein the cable mounting structure bears a shoulder unitarily formed with a threaded component of the cable mounting structure effective as a limit stop of to limit relative movement of the adjuster.

16. The connector of claim 14, wherein the adjuster is urged by a spring directly, without an intervening thrust washer, onto a non-rotating surface in a fixed rotational relationship to the coupler.

17. The connector of claim 14, further comprising:
    a chassis in a stable axial relationship with the coupler, the chassis defining a channel within which the cable mounting structure is laterally and anti-rotationally stabilized, the chassis comprising two primary parts unitized by an interference fit.

18. The connector of claim 14, further comprising:
- a chassis in a stable axial relationship with the coupler, the chassis defining a channel within which the cable mounting structure is laterally and anti-rotationally stabilized; and
- a spring arranged to bias the axial relative displacement between the cable mounting structure and the adjuster and held captive within the chassis.

19. The connector of claim 14, further comprising a spring arranged to oppose the optical component to be affixed and to urge the connector into a stable spatial relationship with the optical component.

20. The connector of claim 14, the ferrule being polished at an angle displaced from an axis of the connector.

21. The connector of claim 14, the terminal end of the ferrule being coated with an antireflective coating.

22. The connector of claim 14, wherein the coupler is a coupling nut conforming to the FC standard.

23. A connector, comprising:
- a coupler designed to affix an optical component;
- a cable mounting structure designed to retain an optical cable, and to retain a terminating ferrule in an optical alignment with the optical component; and
- an adjuster bearing threads mating to threads of the cable mounting structure, an axial relative displacement between the cable mounting structure and the optical component being adjustable by relative rotation of the cable mounting structure and adjuster.

24. The connector of claim 23, wherein the adjuster is urged by a spring directly, without an intervening thrust washer, onto a non-rotating surface in a fixed rotational relationship to the coupler.

25. The connector of claim 23, further comprising:
- a chassis in a stable axial relationship with the coupler, the chassis defining a channel within which the cable mounting structure is laterally and anti-rotationally stabilized, the chassis comprising two primary parts unitized by an interference fit.

26. A connector, comprising:
- a coupler designed to affix an optical component;
- a cable mounting structure designed to retain an end of an optical fiber in an optical alignment with the optical component, the cable mounting structure bearing threads mating to threads of an adjuster, an axial relative displacement between the cable mounting structure and the optical component being adjustable by relative rotation of the cable mounting structure and adjuster; and
- the cable mounting structure bearing a shoulder unitarily formed with a threaded component of the cable mounting structure effective as a limit stop of to limit relative movement of the adjuster.

27. The connector of claim 26, wherein the adjuster is urged by a spring directly, without an intervening thrust washer, onto a non-rotating surface in a fixed rotational relationship to the coupler.

28. The connector of claim 26, further comprising:
- a chassis in a stable axial relationship with the coupler, the chassis defining a channel within which the cable mounting structure is laterally and anti-rotationally stabilized, the chassis comprising two primary parts unitized by an interference fit.

29. The connector of claim 26:
- further comprising a resilient member integrated into the connector, and designed to induce added friction in the mating threads and to stabilize the axial relative displacement between the cable mounting structure and the optical component.

30. A connector, comprising:
- a coupler designed to affix an optical component; and
- a cable mounting structure designed to retain an end of an optical fiber in an optical alignment with the optical component;
- an adjuster threaded onto the cable mounting structure and coupled in a fixed axial relationship with the coupler, the adjuster designed to adjust an axial position of the cable mounting structure relative to the coupler by rotation of the adjuster;
- the adjuster being urged by a spring directly, without an intervening thrust washer, on a non-rotating surface in a fixed rotational relationship to the coupler.

31. The connector of claim 30, further comprising:
- a chassis in a stable axial relationship with the coupler, the chassis defining a channel within which the cable mounting structure is laterally and anti-rotationally stabilized, the chassis comprising two primary parts unitized by an interference fit.

32. The connector of claim 30:
- further comprising a resilient member integrated into the connector, and designed to induce added friction in the mating threads and to stabilize the axial relative displacement between the cable mounting structure and the optical component.

33. The connector of claim 30, further comprising a spring arranged to bias the axial relative displacement between the cable mounting structure and the adjuster.

34. The connector of claim 30, the cable mounting structure being held in an axial sliding relationship with the coupler, with anti-rotational stability, by keyed mating of components of the connector.

35. The connector of claim 34, the keyed mating components comprising male and female members mating at a regular polygon cross section.

36. The connector of claim 30, further comprising a key to mate with a key way of the optical component to be affixed, the key and key way being cooperatively designed to provide anti-rotational stability to the cable mounting structure.

37. The connector of claim 30, wherein the coupler is a coupling nut conforming to the ST standard.

38. The connector of claim 30, wherein the coupler is a coupling nut conforming to the FC standard.

39. A connector, comprising:
- a coupler designed to affix an optical component;
- a cable mounting structure designed to retain an end of an optical fiber in an optical alignment with the optical component;
- a chassis in a stable axial relationship with the coupler, the chassis defining a channel within which the cable mounting structure is laterally and anti-rotationally stabilized, the chassis comprising two primary parts unitized by an interference fit.

40. The connector of claim 39, the cable mounting structure being held in an axial sliding relationship with the coupler, with anti-rotational stability, by keyed mating of components of the connector.

41. The connector of claim 40, the keyed mating components comprising male and female members mating at a regular polygon cross section.

42. The connector of claim 39, wherein:
- the cable mounting structure bears threads mating to threads of an adjuster, an axial relative displacement between the cable mounting structure and the optical component being adjustable by relative rotation of the cable mounting structure and adjuster;

and further comprising a threaded locknut designed to jam relative rotation of the cable mounting structure and adjuster to secure a position of the relative rotation of relative rotation of the cable mounting structure and adjuster.

43. The connector of claim 42, wherein the locknut is threaded onto the chassis.

44. The connector of claim 43, wherein the adjuster, chassis, and locknut are cooperatively designed to jam the relative rotation of the cable mounting structure and adjuster by tightening the locknut against the adjuster.

45. The connector of claim 42, the locknut being threaded onto the cable mounting structure for jamming against the adjuster.

46. The connector of claim 39, further comprising:

an adjuster threaded onto the cable mounting structure and coupled in a fixed axle relationship with the coupler, the adjuster designed to adjust an axle position of the cable mounting structure relative to the coupler by rotation of the adjuster.

47. The connector of claim 39, further comprising:

an adjuster threaded onto the cable mounting structure and coupled in a fixed axial relationship with the coupler, the adjuster designed to adjust an axial position of the cable mounting structure relative to the coupler by rotation of the adjuster;

further comprising a resilient member integrated into the connector, and designed to induce added friction in the mating threads and to stabilize the axial relative displacement between the cable mounting structure and the optical component.

48. The connector of claim 39, further comprising a spring arranged to bias the axial relative displacement between the cable mounting structure and the adjuster.

49. The connector of claim 48, wherein the spring is held captive within the two unitized parts of the chassis.

50. The connector of claim 39, further comprising a spring arranged to oppose the optical component to be affixed and to urge the connector into a stable spatial relationship with the optical component.

51. The connector of claim 39, further comprising a key to mate with a key way of the optical component to be affixed, the key and key way being cooperatively designed to provide anti-rotational stability to the cable mounting structure.

52. The connector of claim 39, wherein the coupler is a coupling nut conforming to the ST standard.

* * * * *

UNITED STATES PATENT AND TRADEMARK OFFICE
CERTIFICATE OF CORRECTION

PATENT NO. : 6,250,818 B1
DATED : June 26, 2001
INVENTOR(S) : Loughlin et al.

Page 1 of 1

It is certified that error appears in the above-identified patent and that said Letters Patent is hereby corrected as shown below:

<u>Column 10,</u>
Line 17, "arc" should read -- are --.

<u>Column 15, claim 46,</u>
Line 20, "axle" should read -- axial --.

Signed and Sealed this

Twenty-sixth Day of February, 2002

Attest:

JAMES E. ROGAN
*Attesting Officer*   *Director of the United States Patent and Trademark Office*